3,395,205
INTERNAL CALIBRATION OF EXTRUDED
PIPES AND HOSES
Aristovoulos George Petzetakis, Thessaloniki & Chandri
St., Moschaton, Piraeus, Greece
Filed Oct. 29, 1964, Ser. No. 407,508
Claims priority, application Greece, Nov. 22, 1963,
25,731
8 Claims. (Cl. 264—209)

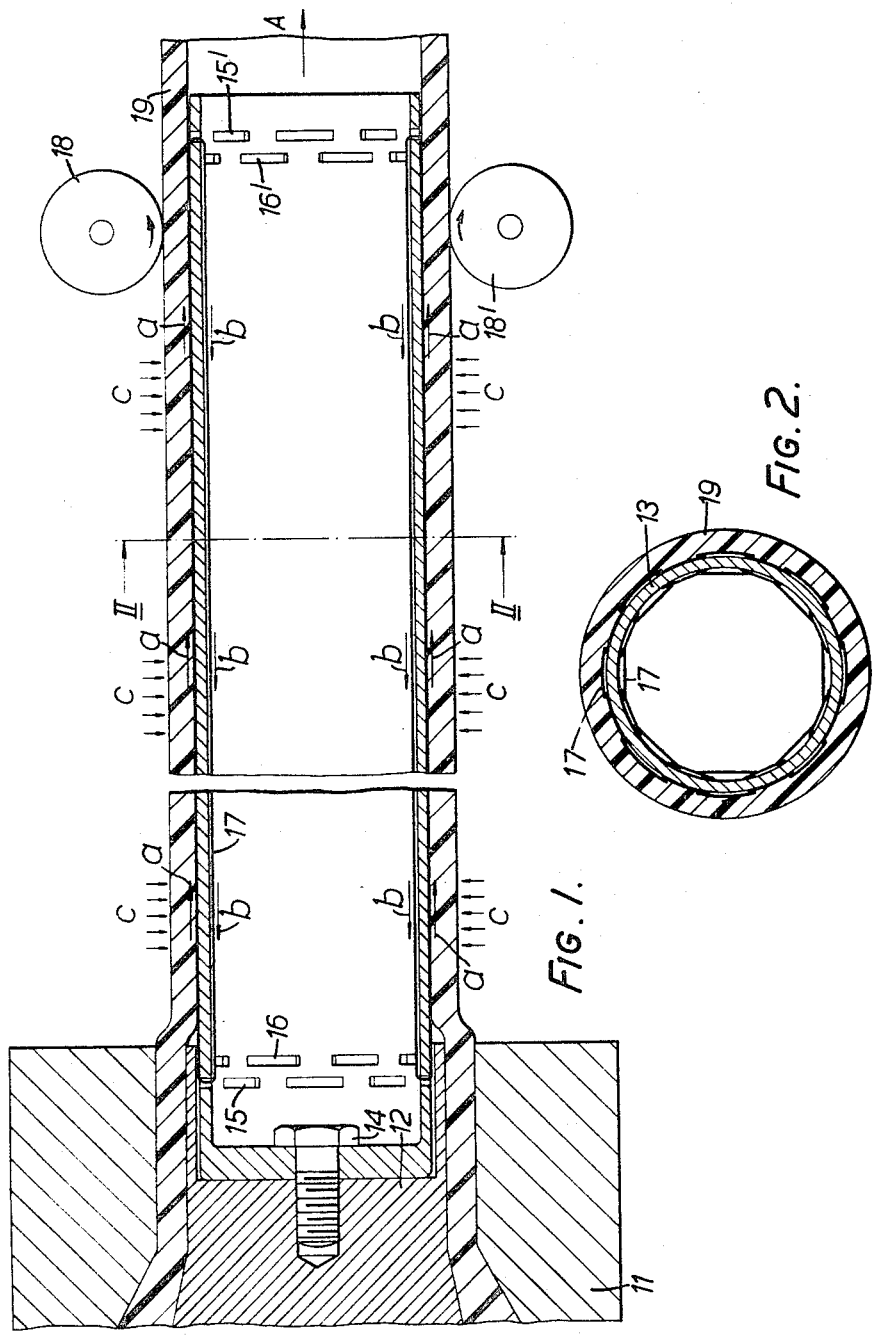

ABSTRACT OF THE DISCLOSURE

The invention relates to the internal calibration of extruded pipes and hoses. The pipe, or hose is extruded around the exterior surface of a rigid cylindrical caliber. The pipe or hose is drawn along the caliber by rotating rolls engaging the solidified portion of the pipe or hose. The surface of the caliber is entirely covered with longitudinally extending thin, flexible, free-running continuous tapes, which are moved by the pipe or hose itself to convey the still unsolidified hose material along the caliber without adhering to the caliber surface. The tapes are able to cover the entire caliber surface by being thin and flexible, to avoid any adherence of the pipe or hose to the caliber.

---

The present invention relates to a method of and apparatus for calibrating tubes such as, for example, hoses of plastic or similar material.

This invention provides a method and an apparatus whereby tubes, such as hoses made of plastic or other similar materials, which are in an unstable plastic condition may be calibrated internally or externally to an accurate cylindrical shape, say, of a given diameter and maintain this shape for a period of time during which, by treating them by cold or by heat, depending on the raw materials which are used (thermoplastic or thermosetting), tubes are changed from an unstable plastic condition into a stable condition, thereby stabilizing the tube into the given external or internal diameter.

Methods for the continuous calibration of hoses whereby the plastic hose extruded from an extruder comes first in contact with the cold metallic walls of a cylinder (known as a calibre), on which it subsequently slides and becomes stabilized can be applied only to a limited number of raw materials, as for instance rigid P.V.C. and polyethylene, which have the property of solidifying immediately as they come in contact with cold metallic surfaces. However, most thermoplastic materials either do not solidify immediately or cannot slide on metallic surfaces of calibres. This also happens to thermosetting and to elastic materials.

According to one aspect of the invention a method of calibrating a tube comprises solidifying the tube from a plastic state whilst conveying the tube along a rigid fixed support member on a moving calibrating surface sliding along the support member and interposed between the tube and the support member.

According to another aspect of the invention an apparatus for calibrating a tube comprises a rigid fixed support member and a movable calibrating surface arranged to slide along the support member and for the tube to be conveyed on said surface along the support member whilst solidifying from a plastic state with said surface interposed between the tube and the support member.

The invention will now be described by way of example only with reference to the accompanying drawings, wherein:

FIGURE 1 is a longitudinal section through an apparatus for calibrating a tube internally in accordance with the invention, and FIGURE 2 is a section along the line II—II of FIGURE 1.

In this example the interior of the thermoplastic hose does not come in direct contact with the stationary metallic walls of the support member immediately as it emerges from the die of an extruder, but comes into contact with an intermediate moving cylindrical calibrating surface on which it sets and is uniformly calibrated, while being continuously driven along the support member.

The apparatus shown in the accompanying drawing comprises an extrusion die head 11 having an internal die mandrel 12 onto which a rigid tubular support member 13 is firmly secured by means of a screw 14.

The support member 13 has slots 15, 16 and 15', 16' through which endless belts in the form of tapes 17 extend between the interior and exterior of the caliber.

As shown in the drawing, the slots are disposed preferably in two series, so that the external surface of the support member 13 be entirely covered by the tapes 17. The support member may be made of metal or other compact material. It may or may not be externally coated with a material to facilitate the sliding of the tapes on it and it may or may no have also shallow grooves long its entire length for guiding the tapes.

The flexible tapes 17 are endless and they slide on the external surface of the support member 13 in the direction of the arrows $a$. They subsequently enter the interior of the support member through slots 15' and 16', to form return reaches following an opposite direction as shown by arrows $b$. They then return to the surface of the support member through the slots 15 and 16, and so on. (The return reaches of the tapes may alternatively return along the exterior of the support member 13 underneath the conveying reaches.)

It is desirable that the tapes should be very flexible in order to pass through the slots 15, 16, 15', 16', the edges of which may advantageously be rounded. The tapes should also have a low coefficient of friction so as to slide readily along the member 13, whereon they are supported so as to calibrate the hose accurately. A suitable material for the tapes has been found to be glass fibre-reinforced polytetrafluoroethylene, such as that sold under the registered trademark "Teflon."

By this disposition of the tapes around the surface of the support member 13 there is formed the above-mentioned interposed cylindrical calibrating surface which lies on the support member and which can move continuously.

Through the take-off machine which is shown in the drawing by the cylinder 18, 18', the plastic hose 19 which has already been stabilized, is hauled-off at a constant speed in the direction of arrow A. The hauling speed is regulated in relation to the extrusion speed of the hose from the extruder.

This motion of the hose, whose internal surface has been formed by contact with the flexible tapes 17, drives these tapes uniformly in the direction of arrows thus forming a cylindrical calibrating surface which moves continuously in the direction of the hauled-off hose and at the same speed.

The hose extruded from the dies 11, 12 in a thermoplastic condition, surrounds the tapes 17, adheres to them and tightens them forthwith by the creation of a slight under-pressure inside the hose. The tapes, however, being already in motion, convey the soft hose without difficulty. During the time in which the hose is driven forward on the tapes to the take-off machine, it fully solidifies. This solidification is obtained by cooling for thermoplastic materials and by heating for thermosetting or elastic materials, in which case the materials are cured or vulcanized. In the attached drawing the arrows $c$ indicate the corresponding cold or heat treatment.

It is therefore apparent that by this method the motion of the take-off machine hauls-off the solidified plastic hose, which in its turn, sets in motion the intermediate cylindrical surface of the tapes which, in their turn, set in motion and convey the plastic hose ejected from the extruder in malleable state. It is, therefore, obvious that the motion of the plastic hose and moving tapes is reversible (being self-powered).

In a modification of the invention, a hose is calibrated externally by means of a modification of the apparatus shown in the drawings.

In this modification, the hose is extruded into a bore in a rigid support member such as member 13. The hose then is conveyed along the bore on a moving calibrating surface such as the internal reaches of the tapes, now sliding in the direction of arrow *a* along the bore surface, and solidifies from its plastic state whilst being so conveyed. The hose is thereby externally calibrated.

The hose may be simultaneously calibrated both internally and externally by conveying the hose along two rigid fixed support members on moving calibrating surfaces, one inside the hose and one outside, such as the tapes already described.

In a further modification, the hose is externally calibrated some time after it has been extruded. This case concerns chiefly the continuous vulcanization of rubber hoses which must be braided after their extrusion and must also have this braiding covered with another sheet of rubber before being vulcanized. The hose is then conveyed along a bore as in the first-mentioned modification on a moving calibrating surface and solidifies from its plastic state whilst being so conveyed.

The invention is not limited to hoses, but may be applied to other kinds of tubes.

I claim:

1. A method of making an internally calibrated extruded tube, comprising the steps of extruding the tube material around a rigid caliber which is entirely covered over at least a substantial portion of its length by thin flexible tapes extending, and freely movable, along said caliber, moving the tube material along said caliber, supported on and moving with the tapes, and causing said tube material to at least partially solidify while on the tapes, said tube material being moved along the caliber by drive means engaging said tube material where it is at least partially solidified, said tapes being moved along the caliber by said tube material, unsolidified tube material being conveyed along the caliber by the movement of the tapes and the tapes preventing the tube material from adhering to the covered portion of the caliber.

2. The method as set forth in claim 1, wherein the tube material is thermoplastic and is solidified by being cooled during its movement along the caliber.

3. The method as set forth in claim 1, wherein the tube material is thermosetting and is solidified by being heated during its movement along the caliber.

4. The method according to claim 1, wherein the tapes overlap on the caliber to ensure prevention of the tube material from coming into contact with the caliber.

5. The method according to claim 1, wherein the tube is made in the form of a flexible hose.

6. In an apparatus for making an extruded tube by means of an extruder, the provision of a calibrating device to calibrate the tube internally, comprising a caliber arranged for the extruder to extrude the tube material around the outside surface of said caliber, thin, flexible tapes extending along said caliber from adjacent the extruder to cover all the outside surface of at least a substantial portion of said caliber adjacent the extruder, said tapes being freely movable along the extruder to convey said tube material therealong, and drive means to drivingly engage an at least partially solidified portion of said tube material at a distance from the extruder to draw said tube material, and hence said tapes, along the caliber whereby the tapes will convey solidifying tube material along said caliber.

7. The apparatus as set forth in claim 6, wherein the tapes overlap on the caliber and are guided through laterally overlapping slots in the caliber staggered in the longitudinal direction.

8. The apparatus as set forth in claim 6, wherein the drive means is formed by drivable rollers arranged adjacent the caliber a distance along the caliber from the extruder to engage the solidified portion of the tube.

References Cited

UNITED STATES PATENTS

| | | | |
|---|---|---|---|
| 2,814,071 | 11/1957 | Allan | 264—209 |
| 3,003,194 | 10/1961 | Munkeler | 264—209 |
| 3,151,358 | 10/1964 | Gerber | 264—290 |
| 3,217,359 | 11/1965 | Euling | 264—209 |

FOREIGN PATENTS

| | | |
|---|---|---|
| 670,552 | 1/1939 | Germany. |
| 431,619 | 10/1934 | Great Britain. |
| 599,402 | 1959 | Italy. |

ROBERT F. WHITE, *Primary Examiner.*

R. R. KUCIA, *Assistant Examiner.*